United States Patent [19]

Pope

[11] Patent Number: 5,542,044

[45] Date of Patent: Jul. 30, 1996

[54] SECURITY DEVICE FOR A COMPUTER, AND METHODS OF CONSTRUCTING AND UTILIZING SAME

[76] Inventor: Shawn P. Pope, P.O. Box 2224, Rolla, Mo. 65401

[21] Appl. No.: 354,202

[22] Filed: Dec. 12, 1994

[51] Int. Cl.⁶ .................................................. G06F 11/00
[52] U.S. Cl. ............................................ 395/186; 395/490
[58] Field of Search ..................................... 395/575, 425, 395/186, 490, 726, 497.04; 371/10.1; 364/286.4, 286.5, 918.7

[56] References Cited

U.S. PATENT DOCUMENTS

| | | | |
|---|---|---|---|
| 4,128,874 | 12/1978 | Perti et al. | 364/200 |
| 4,328,542 | 5/1982 | Anastas et al. | 364/200 |
| 4,388,695 | 6/1983 | Heineman | 395/490 |
| 4,685,056 | 8/1987 | Barnsdale, Jr. et al. | 364/200 |
| 5,014,191 | 5/1991 | Padgaonkar | 364/200 |
| 5,067,077 | 11/1991 | Wakimoto et al. | 395/490 |
| 5,202,997 | 4/1993 | Arato | 395/425 |
| 5,237,616 | 8/1993 | Abraham | 380/49 |
| 5,251,304 | 10/1993 | Sibigtroth et al. | 395/425 |
| 5,261,108 | 11/1993 | Hayashi et al. | 395/490 |
| 5,313,639 | 5/1994 | Chao | 395/725 |
| 5,321,825 | 6/1994 | Song | 395/490 |
| 5,375,243 | 12/1994 | Parzych et al. | 395/725 |
| 5,490,552 | 5/1986 | Guttag et al. | 395/490 |

Primary Examiner—Robert W. Beausoliel, Jr.
Assistant Examiner—Joseph E. Palys
Attorney, Agent, or Firm—Weiner, Carrier & Burt, P.C.; Joseph P. Carrier; Irving M. Weiner

[57] ABSTRACT

A security device is disclosed for a computer having a controller, a main storage device and a drive for an auxiliary storage device, the security device comprises a first mechanism for electronically connecting the computer controller to the auxiliary storage device drive, a second mechanism operatively connected to the first mechanism for selectively blocking signals passing between the computer controller and the auxiliary storage device drive so that the drive is at least partially disabled, and the second mechanism including a lock which is selectively actuatable by the operator independently of operating the computer for enabling and disabling the second mechanism. Additionally, the security device also preferably includes a communication driver which may be loaded into the computer for cooperating with the computer controller to operatively partition a main storage device of the computer into a safe storage area storing pre-existing programs and data, and a working storage area for temporarily storing new data input by a user, and the second mechanism may be actuated so as to either totally disable the auxiliary storage device drive or to partially disable the auxiliary storage device drive such that it may only input data to and retrieve data from the working storage area of the partitioned main storage device.

17 Claims, 6 Drawing Sheets

SECURITY DEVICE FOR A COMPUTER, AND METHODS OF CONSTRUCTING AND UTILIZING SAME

BACKGROUND OF THE INVENTION

1. Field Of The Invention

The invention relates generally to a security device for a computer and to methods of constructing and utilizing same. More particularly, the present invention pertains to a security device which may be installed on substantially any type of personal computer for protecting the computer against unauthorized corruption, loss, and theft of data, as well as against the introduction of computer viruses.

2. Description Of Relevant Art

In the art of computers there are often encountered various problems associated with the security of information and programs stored on the main or hard storage disk of the computer, such problems including the introduction of computer viruses onto the hard disk, as well as the loss, corruption and theft of data stored on the hard disk. These problems are particularly prevalent in situations where a computer is used by many different persons, such as in educational and business environments.

In response to such problems, various known responses have been introduced. For example, it is conventionally known to assign authorized users a personalized, secret code or password which the users must enter before they are permitted access to programs and data stored on the computer's hard disk. Similarly, it is conventionally known to provide a lock on the computer keyboard and an associated key which may be used to adjust the lock between a locked position thereof (in which the keyboard may not be used to enter any instructions or information into the computer) and an unlocked position thereof (in which the keyboard and computer may be used in a conventional manner).

Although both of such known responses are effective for preventing the discussed security problems to an extent, there are several disadvantages and drawbacks to each of such responses. For example, neither of such known responses is effective to prevent an otherwise authorized user who has a proper password or is using the keyboard in an unlocked position from introducing a virus onto the computer hard disk or from deleting, corrupting or stealing data stored on the hard disk. Again, it will be noted that many users are often authorized to use a given computer in an educational or business environment, although none of such users would normally be authorized to introduce a virus onto the computer's hard disk or to delete, corrupt or steal data which is stored on the disk.

Further, with both of such known responses, the computer is rendered completely unusable, and not simply unusable in relation to undesired activities involving computer viruses or the deletion, corruption or stealing of data.

Still further, due to the software-based nature of a user code or password, this type of response to the security problems has been circumvented by unauthorized persons or hackers who are able to determine a code/password or who are otherwise able to avoid the necessity of entering an authorized code/password.

According to another known response to the discussed security problems, there are known and commercially available software programs, including a program by Norton Utilities, which may be loaded into the computer for detecting whether a virus has been loaded onto the hard disk and for removing a virus from the hard disk once it has been detected. Again, although such software programs are desirable and advantageous for combating computer viruses, there are significant limitations associated therewith. For example, these programs do not prevent users from gaining access to programs and information stored on the hard drive so that users may improperly delete, corrupt and steal data stored on the hard drive; they do not, in the first instance, prevent computer viruses from being loaded into the computer; given the software-based nature of these programs they may be circumvented by clever hackers; etc.

The present invention has been developed to overcome the many disadvantages and limitations of the prior responses to computer security problems, including those discussed above, and to generally fulfill a great need in the art by providing a relatively simple and inexpensive security device which may be attached to substantially any computer having main and auxiliary storage devices for preventing users of the computer from introducing damaging viruses into the computer's main storage disk and from deleting, corrupting or extracting data from the main storage disk, and which simultaneously permits the computer to be normally functional and usable for most conventional uses of the computer.

SUMMARY OF THE INVENTION

According to the invention there is provided a security device for a computer having a controller, a main storage device and a drive for an auxiliary storage device, the security device comprising: first means for electronically connecting the computer controller to the auxiliary storage device drive; second means operatively connected to the first means for selectively blocking signals passing through the first means between the controller and the auxiliary storage device drive so that the drive is at least partially disabled: and the second means including a locking mechanism which is selectively actuatable by an operator independently of the computer for adjusting the second means between operative and non-operative states thereof. Preferably, the locking mechanism will include a key that may be selectively associated therewith for actuating and deactuating the security attachment.

Additionally, the security device according to the invention will preferably include a third means for operatively partitioning the main storage device of the computer into a safe storage area storing pre-existing programs and data, and a working storage area for storing new data input by a user; and the second means selectively blocks signals passing through the first means so as to disable the auxiliary storage device from reading information from and writing information to said safe storage area.

Also preferably, the first means will electronically connect the computer controller to a plurality of auxiliary storage devices, the second means will be capable of functioning in multiple distinct operational modes, and the security attachment includes fourth means for adjusting the second means to selectively function in different ones of the operational modes.

It is an object of the invention to provide a security attachment for a personal type computer which unfailingly protects the main or hard storage disk of the computer against the introduction of computer viruses, and also unfailingly protects against the loss, corruption and theft of data stored on the computer's main storage disk.

It is another object of the invention to provide such a security attachment which otherwise permits the computer to be used in a normal fashion for functions not affecting the security of the main storage disk.

Still another object of the invention is to provide such a security attachment having several different security operating modes and means for easily adjusting the security Yet another object of the invention is to provide such a security attachment which is simple to install and utilize, and yet is economic to produce.

A still further object of the invention is to provide such a security attachment which cannot be circumvented by computer hacker techniques.

Other objects, advantages and salient features of the present invention will become apparent from the following detailed description, which, when taken into conjunction with the annexed drawings, discloses preferred embodiments of the invention.

DETAILED DESCRIPTION OF THE PREFERRED EMBODIMENT

Figure 1:
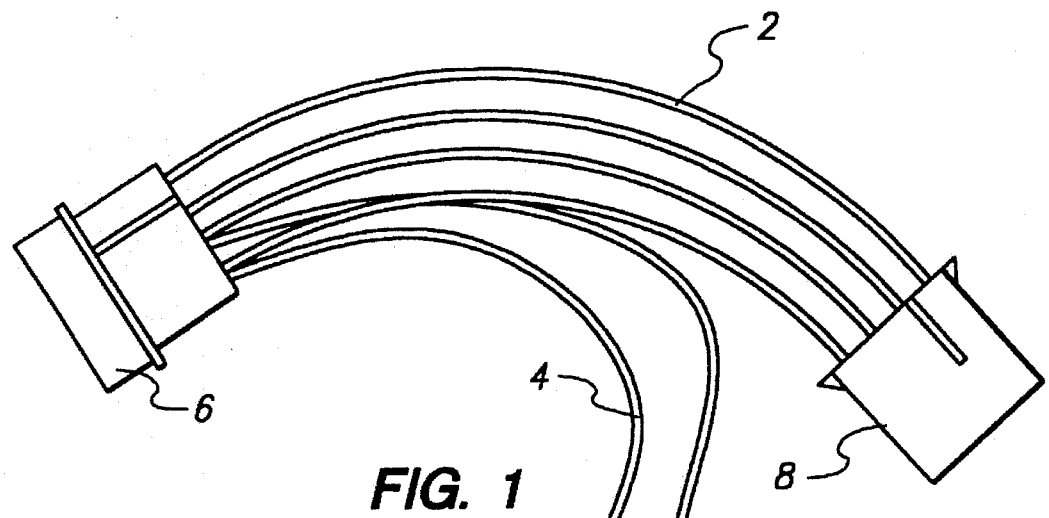
FIG. 1 is a perspective view of an attachment portion of a security device according to a preferred embodiment of the invention.
Figure 1:
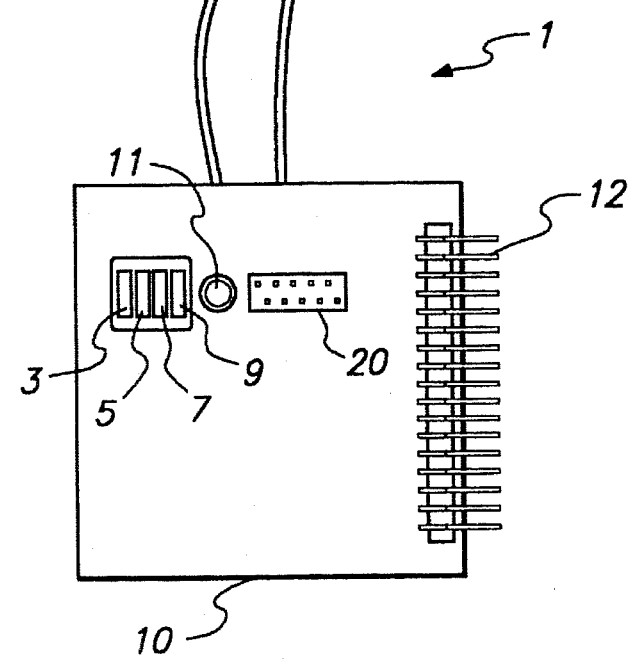

Referring to FIG. 1, there is shown (full size) an attachment portion of a security device according to the preferred embodiment of the invention. Other important components of the security device which are used together with the attachment portion 1 include a locking mechanism (which may comprise the standard keyboard lock provided on many conventional computers as discussed further below) and an optional communication driver as discussed further below in relation to FIGS. 4a–4d.

Figure 2:
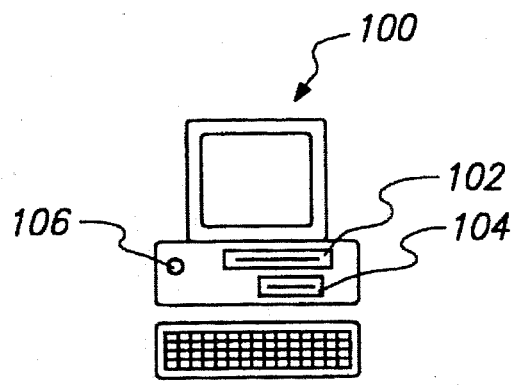
FIG. 2 is a front elevational view of a conventional personal computer with which the security device of the invention may be used.

The attachment portion itself is generally indicated at 1, and includes electrical cables 2, 4, electrical connectors 6, 8 and control unit 10. The control unit 10 has multipin connectors 12, 20, switches 3, 5, 7, 9, and a power indicator light 11 provided therewith. The switches 3, 5, 7, 9 may be dip switches, for example. The cables 2, 4, the connectors 6, 8, and connectors 12, 20 have conventional structures because they are adapted to be directly and simply installed within a conventional computer, such as the PC type computer 100 shown in FIG. 2, as a replacement for a conventional cable connector that is within the computer 100 interconnecting the computer controller such as a floppy control card with the drive(s) for auxiliary storage device(s) such as floppy disk drive(s) 102, 104 of the computer, and for cooperating with a conventional keyboard lock structure. Particularly, once the conventional cable connector is removed, the multipin connector 12 of the control unit 10 is connected to the computer controller, the connector 6 is connected to the drive(s) 102, 104 for the auxiliary storage device(s), the connector 8 is connected to an appropriate lock/power-LED plug associated with the computer, and a control lead from the conventional keyboard lock is disconnected from the computer controller and plugged into the cable connector 20 of the attachment portion 1. For example, many conventional IBM® and other brand computers include a keyboard lock therewith, having a standard locking mechanism 106 with a key receiving portion (see FIG. 2) on an outer face of the computer housing, a standard key lock/power-LED plug that is normally plugged into the computer's mother board, and a lead from key receiving portion 106 that is normally connected to the computer controller. Such standard key lock/power-LED plug may be disconnected from the mother board and the connector 8 plugged therein, while the lead from key receiving portion 106 may be disconnected from the computer controller and plugged into the connector 20. The standard key lock plug may, for example, be a five pin, in-line plug whose pins correspond to the functions set forth in Table A below.

TABLE A

| Pin Number | Function/Pin Out |
|---|---|
| 1 | Power |
| 2 | No connection |
| 3 | Ground |
| 4 | Keyboard lock |
| 5 | Ground |

The lead from the key receiving portion 106 may simply be a two pin plug and the key receiving portion 106 may be simply movable between a locked (closed) position and an unlocked (open) position. Alternatively, the key receiving portion 106 could be movable between more than two positions (for example, it could be movable between four positions corresponding to unlocked, both auxiliary drives A, B locked, auxiliary drive A only locked, and auxiliary drive B only locked), in which case the lead going to connector 20 would require more than two pins.

If the computer to which the security device is installed does not include a keyboard lock mechanism, then an appropriate locking mechanism and keylock plug will be provided, in addition to the attachment portion 1, for being connected to the computer as part of the security device according to the invention. The basic floppy cable interface pin out for an IBM® or similar brand personal computer, to which the multi-pin connector 12 would be attached, is shown in Table B herebelow.

TABLE B

| Signal Name | I/O | Signal Pin | Ground Pin |
|---|---|---|---|
| Reduced Write | I | 2 | 1 |
| Reserved | — | 4 | 3 |
| Drive Select 3 | I | 6 | 5 |
| Index | O | 8 | 7 |
| Drive Select 0 | I | 10 | 9 |
| Drive Select 1 | I | 12 | 11 |
| Drive Select 2 | I | 14 | 13 |
| Motor On | I | 16 | 15 |
| Direction Select | I | 18 | 17 |
| Step | I | 20 | 19 |
| Write Data | I | 22 | 21 |
| Write Gate | I | 24 | 23 |
| Track 00 | O | 26 | 25 |
| Write Protect | O | 28 | 27 |
| Read Data | O | 30 | 29 |
| Side 1 Select | I | 32 | 31 |
| Diskette Change | O | 34 | 33 |

When the security attachment 1 according to the invention is installed on the computer 100, as discussed above, several of these signals are routed through the attachment portion 1 and the states of the signals are modified by the control unit 10 when the locking mechanism 106 is disposed in its locked position. The nature of these modifications is such that the computer 100 is unable to determine that the drives 102, 104 for the auxiliary storage devices cannot be accessed during the diagnostic phase of the boot-up process, and this disables the auxiliary storage device drives 102, 104 such that it is not possible to actuate any read or write operations involving the drives. Thus, the security device according to the invention disables the auxiliary storage device drives 102, 104 by electronically disconnecting the drives from the rest of the computer system using the control unit 10, which in turn is manually actuated by the locking mechanism 106. When the auxiliary storage device drives are disabled with the security device according to the invention, it is impossible for a computer virus to infect the computer system because viruses cannot be loaded therein from any auxiliary storage device.

Figures 3A, 3B:
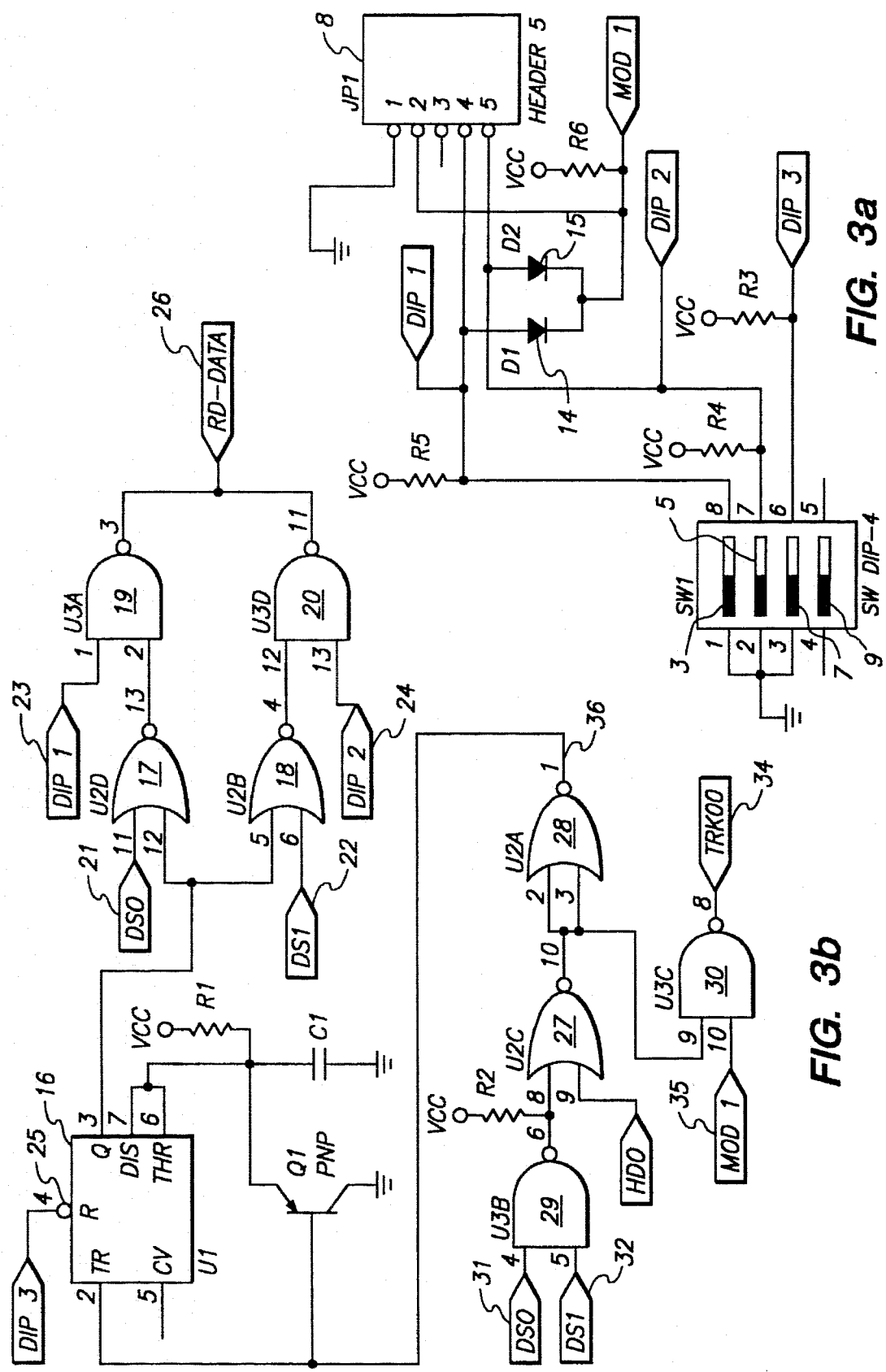
FIGS. 3a and 3b are together a circuit diagram of the attachment portion in FIG. 1.

Referring to FIGS. 3a, 3b, there is shown a circuit diagram of the attachment portion 1 of the security device according to the preferred embodiment of the invention. FIG. 3a shows the switches 3, 5, 7, 9 and associated power leads, while FIG. 3b shows the logic controls effected by the attachment portion.

Figure 4A:
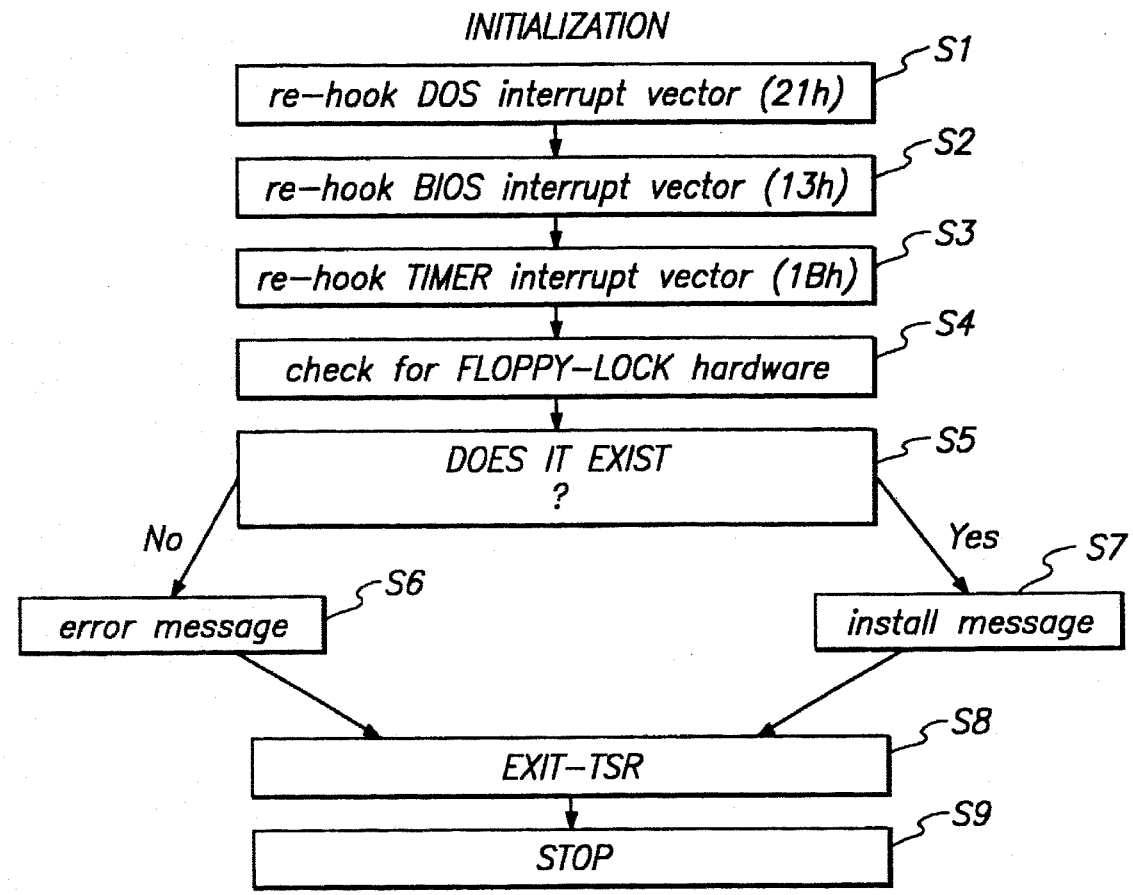
FIGS. 4a, 4b, 4c and 4d are together a flow chart showing the control operation of a communications driver portion of the security device according to the preferred embodiment.

Shown in FIG. 4a are the switches 3, 5, 7, 9 and the connector 8 which would be connected to the computer's mother board. In the depicted embodiment switch 3 would be for disabling one of the auxiliary storage devices 102 or 104 (for example, the A: drive), the switch 5 would be for disabling the other auxiliary storage device 102 or 104 (for example, the B: drive), the switch 7 would be for disabling both auxiliary storage devices 102, 104, and switch 9 is not used. The switch 7 is operatively connected to and controlled by the locking mechanism 106 if the locking mechanism is simply movable between locked and unlocked positions, while the switches 3, 5 would be preset by, for example, the person installing the security device on the computer 100. Alternatively, all three switches 3, 5, 7 could be operatively connected to and controlled by the locking mechanism, as discussed above. The diodes 14, 15 function to assure the separate control of auxiliary storage devices as set by the switches 3, 5, 7.

The logic controls shown in FIG. 3b are arranged in two sections, corresponding to the upper and lower halves of this figure. The upper control section includes a timer chip 16 such as a single shot timer, NOR gates 17, 18, NAND gates 19, 20, inputs 21, 22 from the computer controller, and inputs 22, 23 from the switches 3, 5. This upper logic section functions to establish if either or both of the auxiliary storage devices 102, 104 are to be partially or totally disabled. The inputs 23, 24 indicate whether the switches have been set to the locked or disabled positions thereof, the inputs 21, 22 indicate whether the computer controller is addressing the auxiliary storage device drives 102, 104 for various functions, and the timer chip 16 establishes the amount of time that the drive(s) 102, 104 may be enabled for performing function(s) sought by the computer controller, noting that the drives may be totally disabled by the attachment portion 1 if used alone or only partially disabled by the attachment portion 1 if used together with an optional communications driver as discussed more fully below. The timer chip 16 establishes the time period that the drives 102, 104 may be enabled, and any given request from the computer controller will be allowed if the time for the request falls within the established time period, but will be disallowed if it does not.

Input 25 at the top of the timer 16 is from the switch 7, and hence from the locking mechanism 106. If the switch 7 is in its unlocked position, then the timer 16 is continuously reset and hence continuously enables the drives 102, 104; and if the switch 7 is in its locked position the timer establishes what requests the drives may be enabled to perform depending on whether or not the requisitioned function(s) fall within the preset time period of the timer 16.

The gates 17–20 and inputs 21–24 are symmetrically arranged in parallel corresponding to the two drives 102, 104, i.e., inputs 21, 23 and gates 17, 19 pertain to drive 102, while the inputs 22, 24 and gates 18, 20 pertain to drive 104. Output 26 from the upper logic section goes to the computer controller.

The lower control section includes NOR gates 27, 28, NAND gates 29, 30, inputs 31, 32, 33, 34 from the computer controller, input 35 from the circuit of FIG. 4a and output 36 going to the upper control section. The lower control section corresponds to the requests from, or the set of parameters being requisitioned by, the computer controller which may be performed if the upper control section otherwise establishes that the drives 102, 104 are to be partially or completely enabled.

Table C below presents five possible combinations for the settings of the switches 3, 5 (each of which may be either turned on or off), together with the locking mechanism or switch 7 (which again may be moved between a locked and an unlocked position), and the resulting effect of the security device according to the invention.

TABLE C

| Switch 3 | Switch 5 | Key Lock Position | Effect On Floppy Lock |
|---|---|---|---|
| off | off | locked or unlocked | both drives function normally regardless of the key lock position |
| on or off | on or off | unlocked | both drives function normally |
| on | off | locked | A: drive is disabled B: drive is normal |
| off | on | locked | A: drive is normal B: drive is disabled |
| on | on | locked | A: and B: drives are both disabled |

As shown in Table C, if the key mechanism or switch 7 is in its unlocked position both of the auxiliary storage device drives will function normally regardless of the preset positions of the pair of switches, while if the key mechanism is moved to its locked position one, both, or neither of the drives will be disabled depending on the preset positions of the switches 3, 5.

The security device according to the invention may exclusively comprise the attachment portion 1 and the locking mechanism, through which the drives 102, 104 for the auxiliary storage devices may be selectively disabled as discussed above. If the drives are disabled using only the security portion i and the locking mechanism, the drives are completely inaccessible to persons using the computer; and due to the hardware nature of the attachment portion 1 it is independent of any conventional operations of the computer and cannot be circumvented by hacker techniques or the like. A physical key must be used to disable the security device through the locking mechanism 106, i.e., by putting the locking mechanism in its unlocked position, otherwise the drives 102, 104 will remain inaccessible according to the present condition of the switches as discussed above in relation to Table C.

Although the security device including only the attachment portion 1 and the locking mechanism 106 may be used for completely disabling the auxiliary drives 102, 104, the security device may optionally include a communications driver which may be loaded into the computer 100 and cooperates with the attachment portion 1 and the locking mechanism 106 to partially disable the auxiliary storage device drives 102, 104 such that the drives may be used by an operator to perform limited or restricted functions that do not jeopardize the security and safety of the computer's main storage device and any programs and data stored thereon. The communications driver is discussed below with reference to FIGS. 4a–4d that are collectively a flow chart of the routines thereof.

The communications driver portion is a software based program which, for example, would be loaded into the computer through one of the drives 102, 104 for the auxiliary storage devices after the attachment portion 1 (and, if necessary, the locking mechanism) is installed in the computer 100. The communications driver portion primarily functions to reconfigure the main storage device of the computer, the C: drive on an IBM® brand or similar brand computer, into a safe storage area for storing pre-existing programs (including an operating system such as DOS® and other critical systems files) and data, and a working storage area for temporarily storing new data input by a user of the computer. The reconfiguration effectively, temporarily divides or partitions the main storage device into a pair of storage devices, a first storage device corresponding to the safe storage area (which the computer would continue to recognize as the C: drive, for example) and a second storage device corresponding to the working storage area (which would be recognized by the computer 100 as a different drive such as D: drive). The communications driver software once installed in the computer 100 is preferably stored on the computer's main storage device so that it would not be required to reload the communications driver into the computer each time the computer is turned on, and will be one of the critical systems files protected in the safe storage area of the partitioned main storage device so that it cannot be deleted or modified by an operator using the computer.

According to the preferred embodiment of the invention, the communications driver is very easily installed on a computer 100 with minimal input from an operator so that it can be installed by persons having no training and little knowledge of computers. Particularly, it is preferred that the driver may be installed in the computer by simply inserting an auxiliary storage device (such as a floppy disk or CD ROM) containing the driver into one of the auxiliary drives 102, 104 and entering the command "INSTALL" into the computer. Once installed, the communications driver software is preferably, automatically booted up by the computer in substantially the same manner as an operating system is automatically booted up after it has once been loaded onto the main (hard disk) storage device of the computer 100 each time the computer is turned on and the locking mechanism 1066 is enabled (or turned to its locked position). Each time it is booted up, the communication driver will preferably, automatically partition the computer's main storage device into the safe and working storage areas of predetermined sizes relative to the main storage device. For example, the safe storage area could comprise 75–99% of the storage area of the main storage device, while the working storage area would comprise the remaining 1–25% of the storage area of the main storage device.

The communication driver will optionally permit an operator, during the boot-up procedure, to select the relative sizes of the safe and working storage areas (within limited ranges) and to elect whether the communication driver is to be operational or non-operational (i.e., whether the auxiliary storage device drives 102, 104 will be completely disabled by operation of the storage portion 1 without the communication driver, or whether the auxiliary drives will be partially disabled by the storage portion 1 together with the communication driver).

According to the preferred embodiment of the invention, the data stored by an operator in the working storage area of the partitioned main storage device will only be temporarily stored for as long as the computer remains turned on, and will be deleted once the computer is turned off. Additionally, the operator may command the computer to purge or delete information stored in the safe storage area while the computer 100 remains turned on. Thus the main storage device of the computer may be reconfigured as often as desired or necessary by an operator.

When storing data on the partitioned main storage device, an operator may designate either the main storage device (C: drive, for example) or the drive corresponding to the working storage area (D: drive, for example), but with either designation the communication driver will store the information in the working storage area. The stored data in the working storage area may be accessed using whichever designation the operator used when storing the data (C: drive or D: drive, for example).

Although information may be entered into the computer 100 and temporarily stored on the working storage area of the partitioned main storage device, any such data cannot affect other data and programs stored on the safe storage area of the main storage device. Thus, the computer's main storage device is fully protected from computer viruses and the like, and from unauthorized retrieval, deletion and modification of information stored on the main storage device even when limited use of the auxiliary drives 102, 104 is permitted by the security device of the invention.

According to an important aspect of the invention, the computer system 100 remains functional and usable for many normal operations thereof even when the security device is installed and actuated for completely or partially disabling the computer's auxiliary storage device drive(s). For example, the computer system would still be usable for creating new documents or programs on the computer 100, and for keying in data to the computer's main storage device, and all of such data, new documents or new programs as keyed into the computer while the security device is operating would be stored on the main storage device of the computer 100, i.e., either directly in the main storage device if the communication driver of the invention is not utilized, or temporarily in the working storage area of the reconfigured main storage device if the communication driver of the invention is used.

Figure 4B:
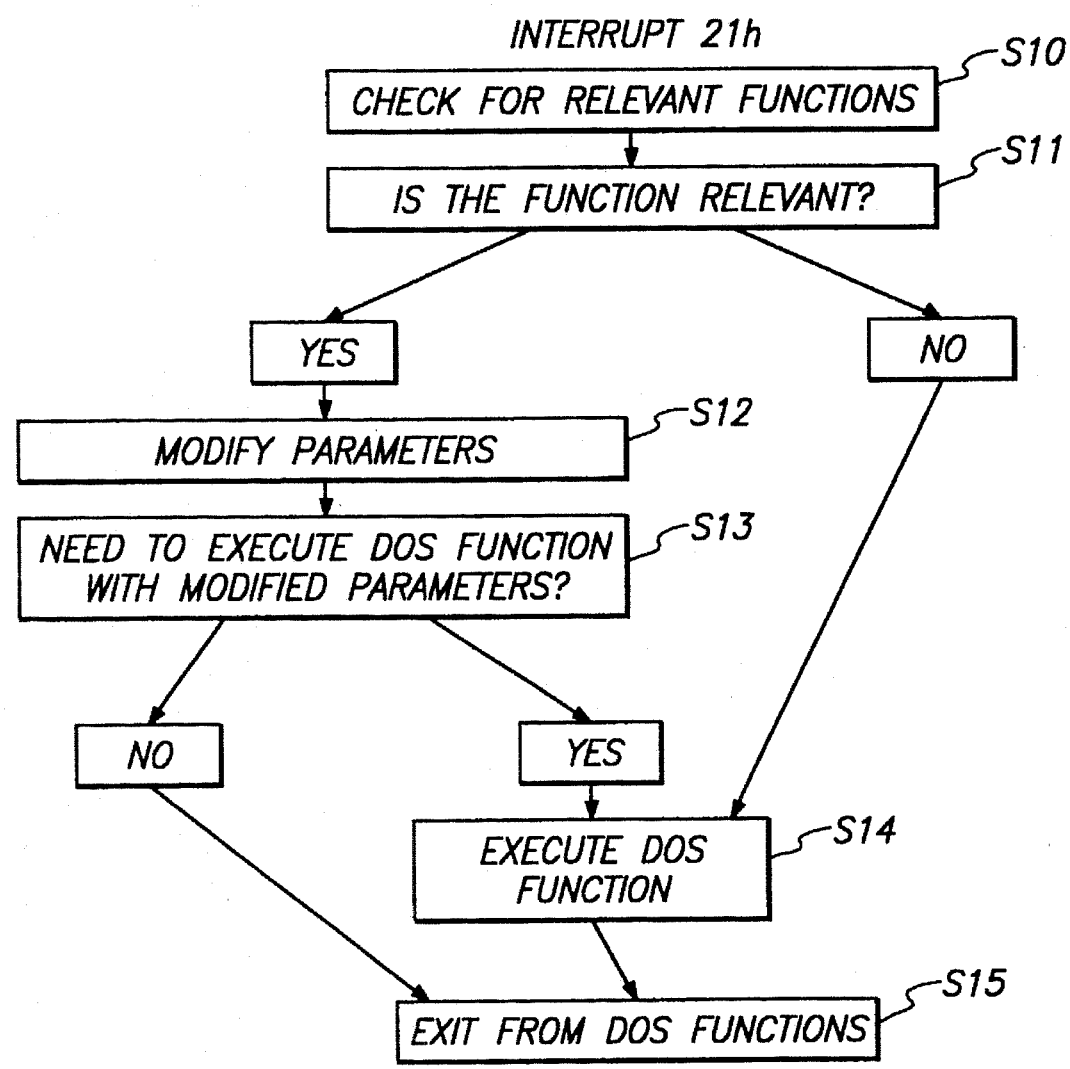
Figure 4C:
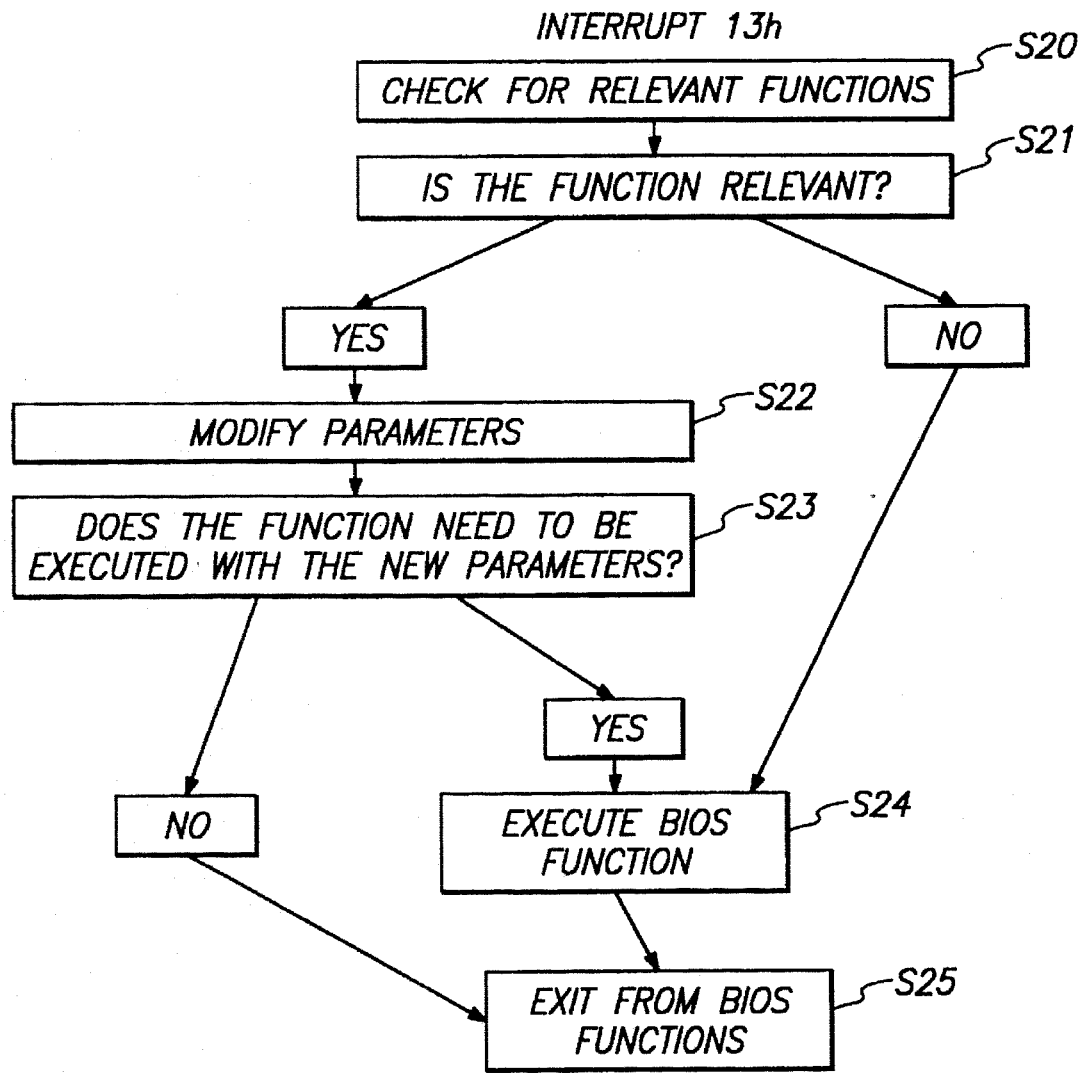
Figure 4D:
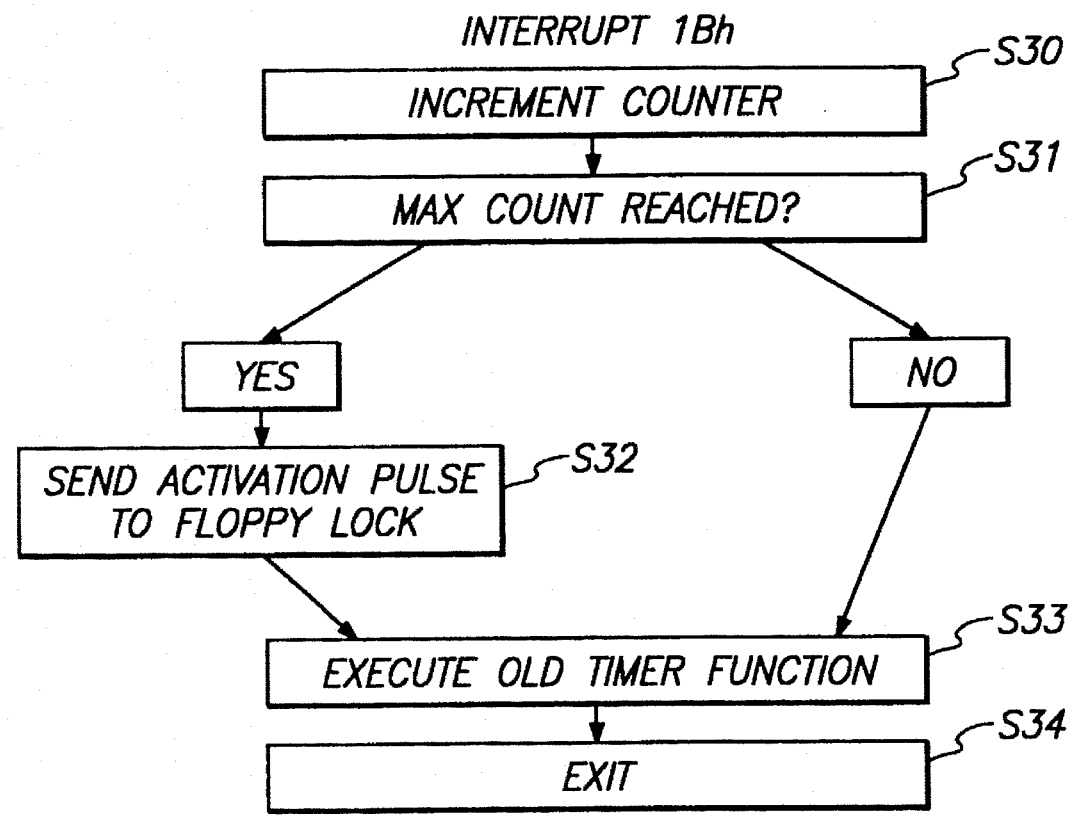

With reference to FIGS. 4a, 4b, 4c, 4d of the application, there is collectively presented a flow chart showing the control operation of the communications driver portion of the security device according to the preferred embodiment of the invention. FIG. 4a represents an initialization routine of the communications driver, FIG. 4b represents a first interrupt routine pertaining to DOS (disk operating system) functions, FIG. 4c represents a second interrupt routine pertaining to BIOS (basic input, output system) functions, and FIG. 4d represents a final and controlling interrupt routine of the driver pertaining to an activation timer.

Referring to FIG. 4a, the initialization routine is shown which operates at the physical sector level of the computer. At steps S1, S2 and S3, the driver re-hooks the interrupt routines of FIGS. 4b, 4c, 4d,respectively. At step S4 the driver addresses the attachment portion 1 to confirm that it exists and at steps S6, S7 an appropriate message is displayed on the computer advising the user that there is an error or that the security device is installed and operational. In step S8 the driver exits the installation routine and in step S9 this routine of the driver is ended.

Referring to FIG. 4b, the first or DOS interrupt routine, the driver checks for DOS functions being communicated by the computer controller in step S10, and in step S11 the driver determines whether any such DOS function identified in step S10 is relevant to operation of the auxiliary storage device drives 102, 104. If the DOS functions are relevant, then the driver modifies the parameters of the function in step S12. In step S13 the driver further determines if the computer 100 is required to execute the DOS function with modified parameters, and if so the modified function is executed in step S14. If the DOS function is determined not to be relevant in step S11, then the function is not modified by the driver and the computer 100 executes the unmodified function in step S14. After the modified or unmodified DOS function is executed in step S14, or if the driver determines that the modified function need not be executed in step S13, the driver then exits from the DOS interrupt routine in step S15.

Referring to FIG. 4c, the BIOS or second interrupt routine of the driver, including steps S20–S25, is identical to the DOS interrupt portion of FIG. 4b except that it pertains to BIOS functions rather than DOS functions being executed by the computer 100.

Referring to FIG. 4d the final and controlling routine of the communications driver is shown. This routine cooperates with the timer 16 of the attachment portion as discussed above for controlling which functions are performed by the auxiliary drives 102, 104 when the attachment device is actuated for partially disabling the drives. If the communications driver partially enables the auxiliary drives 102 and/or 104, then the timer 16 is actuated to measure and control the time(s) the drives 102, 104 are enabled for performing various functions. The driver determines what type of function is being requisitioned by the computer controller, according to the time measured, and correspondingly the requisitioned function is either allowed or disallowed to be performed by the drive(s) 102, 104, i.e., if the measured time for the requisitioned function is less than the preset time period of the timer 16 then it will be performed by the drive(s) 102, 104. Referring to FIG. 4c, at step S30 an increment is counted and at step S31 the driver determines if the incremented count has reached a predetermined maximum count. If the maximum count has been reached, the driver sends an activation pulse to the attachment portion 1. If the maximum count has not been reached in step S31 or after the driver has sent the activation pulse to the attachment portion in step S32, the driver then executes a timer function in step S33 in cooperation with the timer 16, after which the driver exits in step S14.

Although there has been described what is at present considered to be the preferred embodiment of the invention, it will be understood that the invention can be embodied in other specific forms without departing from the spirit or essential characteristics thereof. For example, although the preferred embodiment has been discussed in relation to an IBM® brand or similar personal computer, the security device according to the invention could be used on any other computer system, such as Apple® or Macintosh® brand computers, UNIX® based computer systems, etc. The basic elements of the security device for these other types of computer systems would remain the same, although the specific structural characteristics thereof (including the connectors 6, 8, 12, the control unit 10 and its drive head position simulator 16, the communications driver, etc.) would have to be modified to be compatible with the different computers and systems. Further, although the locking mechanism for enabling and disabling the security device is disclosed as a mechanical mechanism including a tumbler and a key, other appropriate mechanisms could be used such as a keyless electronic lock mechanism could be used or the communications driver portion of the security device could include an optional processing mode for enabling and disabling the security device through software control involving the use of a password and/or user ID number.

The scope of the invention is indicated by the appended claims, rather than by the foregoing description.

I claim:

1. A security device for a computer having a controller, a new information input section, a main storage device, and a drive for an auxiliary storage device, the security device comprising:

first means for electronically connecting the computer controller to the auxiliary storage device drive;

second means operatively connected to the first means for selectively blocking communication signals passing through the first means between the controller and the auxiliary storage device drive so that the drive is at least partially disabled, without affecting other functions of the computer;

said second means including a locking mechanism which is selectively actuatable by an operator independently of operating the computer, for enabling and disabling said second means;

said second means being actuatable in multiple, distinct operative modes, including a first mode which totally disables the auxiliary storage device drive and a second operative mode which partially disables said auxiliary storage device; and third means, operatively connected to said second means, for operatively partitioning the main storage device of the computer into a safe storage area and a working storage area, and for permitting new information entered into the computer through the new information input section to be stored on the computer's main storage device when the second means is actuated in either of said first and second modes.

2. A security device according to claim 1, wherein:

said second means selectively blocks signals passing through said first means such that said auxiliary storage device drive is disabled from all functions except reading data from and writing data to said working storage area.

3. A security device according to claim 1, wherein said second operative mode disables said auxiliary storage device drive for all functions except storing data to and retrieving data from said working storage area of the main storage device.

4. A security device according to claim 1, wherein said locking mechanism includes a locking portion fixed to the computer and a key which may be selectively associated with the locking portion for actuating and deactuating the locking mechanism.

5. A security device according to claim 1, wherein said second means functions in said multiple distinct operative modes when enabled by said locking mechanism; and the security device further includes means for adjusting said second means to selectively function in different ones of said operative modes.

6. A security device according to claim 5, wherein said adjusting means is combined with said locking mechanism such that said locking mechanism may be actuated to selectively set said second means in said different ones of said operative modes and to disable said second means.

7. A security device according to claim 5, wherein said adjusting means includes manually actuatable switch means.

8. A security device according to claim 1, wherein:

the computer includes a plurality of drives for auxiliary storage devices;

said first means connects the controller to each of the auxiliary storage device drives; and said second means selectively blocks signals passing between the controller and each of the auxiliary storage device drives.

9. A security device according to claim 8, wherein:

said second means functions in multiple distinct operative modes relative to each said auxiliary storage device drive; and the security device further includes fourth means for adjusting said second means to selectively function in different ones of said operative modes for each said auxiliary storage device drive.

10. A security device according to claim 1, further including:

a fourth means, operatively connected to said second means, for selectively adjusting said second means between said multiple, distinct operative modes thereof; and said second means further includes a drive head position simulator for simulating a drive in position of the auxiliary storage device drive, a critical head position detector for detecting a critical head position of the auxiliary storage device drive, and lodging means for operatively connecting said drive head position simulator, said critical head position detector, said locking mechanism and said third means so as to block the signals passing through the first means.

11. A security device according to claim 1, wherein said first means comprises cable means shaped to replace a conventional cable interconnecting the computer controller and the auxiliary storage device drive.

12. A security device according to claim 1, wherein:

said second means comprises electronic hardware which may not be bypassed by operating commands entered into the computer.

13. A security device according to claim 1, wherein said third means partitions the main storage device into said safe storage area and said working storage area each time the security device actuated; and any information stored on the working storage area is stored temporarily during ongoing use of the computer and is deleted by said third means when the computer is turned off.

14. A security device for a computer having a controller, a new information input section, a main storage device, and a drive for an auxiliary storage device, the security device comprising:

first means for electronically connecting the computer controller to the auxiliary storage device drive:

second means operatively connected to the first means for selectively blocking signals passing through the first means between the controller and the auxiliary storage device drive so that the drive is at least partially disabled;

said second means including a locking mechanism which is selectively actuatable by an operator independently of operating the computer for enabling and disabling said second means:

third means operatively connected to the second means for partitioning the main storage device of the computer into a safe storage area and a working storage area, and for permitting new information entered into the computer through the new information input section to be stored on the computer's main storage device when the second means is enabled; and said third means comprising a communication driver which is loaded into the computer and operatively cooperates with the computer controller to partition a drive of the computer's main storage device into two separately accessible drives, one of said separately accessible drives corresponds to said safe storage area and the other of said separately accessible drives corresponds to said working storage area.

15. A security device according to claim 1, wherein said second means bypasses the auxiliary storage device drive when the computer is turned on and booted up by the computer controller.

16. A security device for a computer having a controller, a new information input section, a main storage device, and a drive for an auxiliary storage device, the security device comprising:

first means for electronically connecting the computer controller to the auxiliary storage device drive;

second means operatively connected to the first means for selectively blocking communication signals passing through the first means between the controller and the auxiliary storage device drive so that the drive is in at least partially disabled, without affecting other functions of the computer;

third means operatively connected to said second means for partitioning the main storage device of a computer into a safe storage area and a working storage area;

said second means including a locking mechanism which is selectively actuatable by an operator independently of operating the computer, for enabling and disabling said second means; and said second means being actuatable in multiple, distinct operative modes, including a first operative mode which totally disables the auxiliary storage device drive and a second operative mode which disables said auxiliary device drive for all functions except storing data to and retrieving data from said working storage area of the main storage device.

17. A security device according to claim 16, and said third means comprises a communication driver which is loaded into the computer and operatively cooperates with the computer controller to partition a drive of the computer's main storage device into multiple, separately accessible drives, one of said separately accessible drives corresponds to said safe storage area and another of said separately accessible drives corresponds to said working storage area.

* * * * *